Patented May 16, 1939

2,158,162

UNITED STATES PATENT OFFICE 2,158,162

PRODUCTION OF STRONTIUM NITRATE

William De Garmo Turner, New York, N. Y., assignor to H. C. Bugbird Company, Inc., New York, N. Y., a corporation of New York No Drawing. Application February 26, 1934, Serial No. 713,009. Renewed September 23, 1938

9 Claims. (Cl. 23—102)

Strontium occurs in nature largely in the form of strontium sulphate in the ore "celestite." This ore and the strontium sulphate are insoluble in water and in acids. In the production of strontium nitrate from such ore or from the pure strontium sulphate, it has been the practice to first convert the strontium compound to a soluble compound by treatment with sodium hydroxide or sodium carbonate (whereby the sulphate is converted to sodium sulphate, which is of little value) or to reduce the strontium sulphate with carbon or other reducing agents to produce the sulphide of strontium which may then be dissolved in acids or water to give soluble strontium compounds. By following the latter method the sulphate radical is destroyed with the resultant loss in its marketable value.

It is an object of the present invention to provide an improved method for producing soluble salts of strontium from strontium sulphate or celestite or from other insoluble strontium salts and for the separation of the resultant products. It is a further object to provide a method whereby the strontium sulphate may be directly converted into the strontium nitrate. Other objects will become apparent.

I have found that barium nitrate will react directly with the strontium sulphate with the result that the barium is precipitated as barium sulphate (blanc fixe) and the strontium goes into solution as strontium nitrate. The barium sulphate may be separated by filtration and the strontium nitrate may be separated from the filtrate by the crystallization of the saturated solution. The above reaction is very materially hastened by the presence of small quantities of catalytic agents such, for example, as small concentrations of hydrochloric or nitric acid. Also, I have found that the reaction is hastened by finely dividing the strontium sulphate, by increasing the temperature and/or by rapidly agitating the material during the reaction.

The following are specific examples of my improved procedure, although it is not intended to limit the invention to the particular embodiments described, it being apparent that many modifications may be utilized.

The strontium sulphate, together with the other ingredients referred to, may be mixed together in the following proportions and boiled for an hour under a reflux condenser:

Pure strontium sulphate _____ kg. ____ 12
Barium nitrate _____ kg. ____ 17
Water _____ liters__ 50
Concentrated nitric acid (spr gr.
1.42) _____ liter___ 1

Under these conditions about 65% of the strontium sulphate will be dissolved. By continuing the boiling for two days about 96% of the strontium sulphate will dissolve. The reaction may be hastened by mechanical agitation of the reacting substances and small quantities of halogen acid may be substituted for the nitric acid.

My method may be applied directly to celestite in which event I prefer to first subject the celestite to a bleaching action, for example, by boiling it with sulphuric acid and then washing out any iron or organic impurities soluble in the sulphuric acid solution. As an example of such a procedure, a pulverized bleached celestite may be treated in the following concentrations:

Bleached celestite (96% strontium
  sulphate) _____ kg. ____ 75
Barium nitrate (recrystallized) _____ kg. ____ 100
Water _____ liters__ 100
Nitric acid (sp. gr. 1.42) _____ do ____ 2

This mixture may be boiled and vigorously mechanically agitated (preferably with an impeller type of blade rotating at a peripheral speed of at least about 1000 feet per minute) for about 12 to 18 hours. Under these conditions the strontium sulphate and barium nitrate are almost quantitatively converted to strontium nitrate and fine white barium sulphate (admixed with excess celestite and impurities), which may be separated therefrom by any suitable means. It is preferred that a slight excess of strontium sulphate or celestite over the molecular reacting proportions be used. In the case of celestite containing about 5 or 6% impurities, I prefer to use about 8 or 9% excess of celestite over the molecular reacting proportions.

To recover pure strontium nitrate the solution may be treated by various methods. If desired the barium may be completely removed from the solution. For this purpose, it may be desirable to add sulphuric acid to the nitrate solution in sufficient quantities to precipitate any residual barium and to filter off the suspension of barium sulphate. The filtrate may then be evaporated to dryness. In some cases it may be preferred to add a solution of strontium sulphate which, of course, would be very dilute. With this procedure the sulphate will precipitate the barium and the strontium will be converted to nitrate. In some cases it may be preferred to separate the strontium nitrate by fractional crystallization from the above solutions. If it is desired to obtain a product free from barium, however, we prefer to remove the barium before the crystallization.

As indicated above, the process may be hastened by the addition of certain catalysts such, for example, as nitric acid, and hydrochloric acid, when used in the proper proortions. It has been found that from 0.1% up to 16% by weight of nitric acid based upon the total quantity of water in the original mixture (or its equivalent of hydrochloric acid) will speed up the process more and more as the concentration of the catalyst is increased. However, with concentrations of catalyst above about 2% the final percent of conversion to strontium nitrate is considerably reduced. It is preferred, therefore, to use about 1.8% of nitric acid solution of a specific gravity of 1.42 (or its equivalent of other acids, such as hydrochloric acid). The other halide acids may be also used for this purpose.

Impurities in the solution resulting from the treatment with the barium nitrate are mainly in the form of iron or other heavy metals and organic impurities. The iron or other heavy metals may be removed by adding strontium oxide which will precipitate the iron or other heavy metals and leave the strontium as nitrate. The organic impurities will be carried down to a certain extent with the precipitated iron, etc. and may be separated by filtration. Such impurities may also be separated, if desired, by evaporating to dryness and re-dissolving the strontium salt or they may be separated by crystallization of the strontium nitrate from the solution.

The barium sulphate may be further purified, if necessary, by mechanical means known to the arts, to provide a finely divided snow white blanc fixe.

It is important that the strontium sulphate be finely divided, although the conversion may be made with coarser particles. However, when larger particles are used a much longer time will be required to bring about a high conversion.

Other barium compounds may be used for this purpose. For example, barium carbonate (witherite) together with an acid may be used in place of the barium nitrate, although I prefer to use the latter. Or, celestite may be treated with a solution of barium chloride or a solution of barium chloride with an acid catalyst to convert the strontium sulphate to a soluble salt of strontium. Also, the above described treatment may be used to advantage in the direct conversion of other insoluble sulphates, such as lead sulphate, to water soluble salts.

During the reaction a thin film of precipitated barium sulphate is left upon the particles of strontium sulphate and an important consideration in carrying out the invention is to permit a penetration of or diffusion through this film by the soluble barium salt and the very dilute solution of strontium sulphate resulting from its slight solubility. By increasing the temperature, the viscosity of the solution and the time of penetration or diffusion of the reacting solutions are greatly decreased. Also, the vigorous agitation of the particles assists in reducing the thickness of the film and the rapidly moving blades of the agitator slice through the film, thus overcoming the resistance which would normally be set up because of the insoluble film of reacting material on the particles. Also, with higher speed agitation the resultant blanc fixe is of a smoother texture, finer grained and slower settling. Boiling alone gives good agitation, but this may be further improved by the slicing action of the mechanical stirring devices.

The concentration of the solution during the reaction may be varied widely. It has been found that in dilutions such as to keep the mildly soluble barium nitrate dissolved, the reaction is about as rapid as in concentrations such as to produce a hot saturated solution of the readily soluble strontium nitrate. However, when agitation is used, the more highly concentrated mixtures are more effective. The temperatures also may be varied widely from a treatment in the cold with agitation to a boiling under pressure.

The terms used in describing the invention have been used as descriptive terms and not as terms of limitation and it is intended that all equivalents of the terms used be included within the scope of the appended claims.

What I claim is:

1. A method for producing strontium nitrate from strontium sulphate, comprising boiling a mixture of finely divided strontium sulphate and a solution of barium nitrate in the presence of 0.1–16% of an acid capable of forming soluble barium salts, in the proportions of a slight excess of strontium sulphate over molecular reacting quantities, while vigorously agitating the mixture, separating the precipitated barium sulphate and separating the strontium nitrate from the solution.

2. A method as defined in claim 1 in which strontium oxide is added to the solution containing strontium nitrate.

3. A method of producing a water soluble strontium salt from celestite including the step of treating the celestite in the presence of water with witherite and an excess of inorganic acid capable of reacting with the witherite to produce a water soluble barium salt.

4. A method of producing strontium nitrate from strontium sulfate comprising vigorously agitating the strontium sulphate with a solution of barium nitrate in the presence of 0.1–16% of an acid capable of forming soluble barium salts.

5. A method of producing strontium nitrate from strontium sulfate comprising treating strontium sulfate with a solution of barium nitrate in the presence of not more than about 2% of an acid capable of forming soluble barium salts.

6. A method as defined in claim 4 in which the strontium sulfate is in the form of celestite.

7. A method as defined in claim 4 in which the acid is selected from the group consisting of nitric and the halide acids.

8. A method as defined in claim 5 in which the acid is hydrochloric acid.

9. A method as defined in claim 5 in which the acid is nitric acid.

WILLIAM DE GARMO TURNER.